Aug. 30, 1932.  L. A. BIXBY  1,874,229
CLUTCH
Filed June 8, 1929

INVENTOR
Leo A. Bixby
BY Chappell Earl
ATTORNEYS

Patented Aug. 30, 1932

1,874,229

UNITED STATES PATENT OFFICE

LEO A. BIXBY, OF KALAMAZOO, MICHIGAN, ASSIGNOR TO FULLER & SONS MANUFACTURING CO., OF KALAMAZOO, MICHIGAN, A SUBSIDIARY OF UNIT CORPORATION OF AMERICA

CLUTCH

Application filed June 8, 1929. Serial No. 369,373.

The main objects of this invention are:

First, to provide a clutch, the bearings of which may be efficiently lubricated without disassembling.

Second, to provide a clutch of the multiple disk type embodying these advantages.

Objects pertaining to details and economies of my invention will appear from the description to follow. The invention is defined in the claims.

A structure embodying the features of my invention is clearly illustrated in the accompanying drawing, in which.

Figure 1:
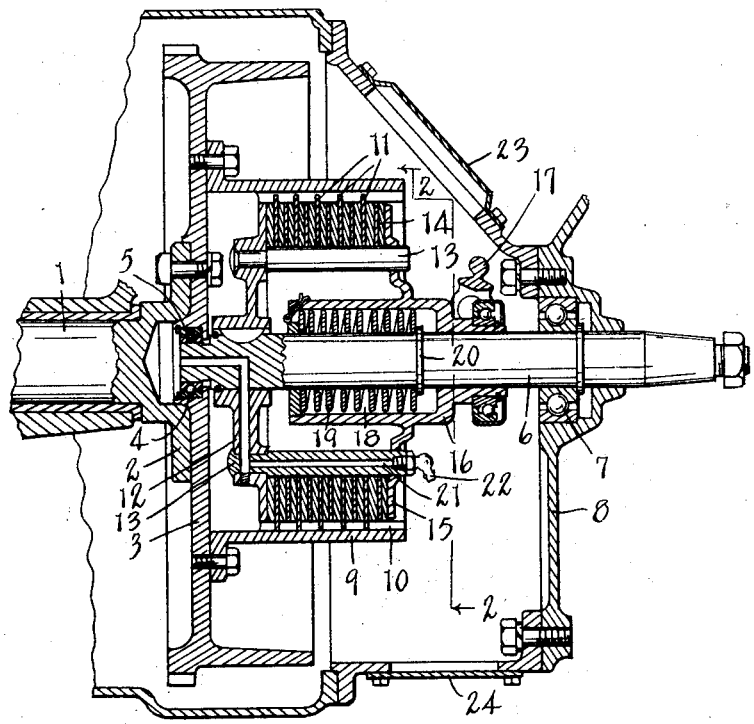
Fig. 1 is a fragmentary view mainly in longitudinal section on a line corresponding to line 1—1 of Fig. 2 of a clutch embodying the features of my invention.
Figure 2:
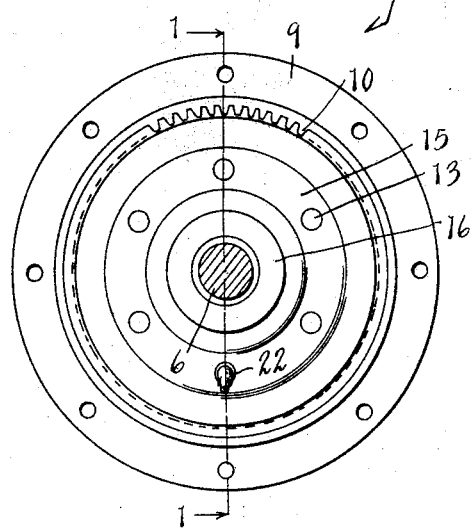
Fig. 2 is a transverse section on a line corresponding to line 2—2 of Fig. 1, certain parts being omitted.

In the accompanying drawing 1 represents a crank shaft or driving shaft which is provided with a flanged head 2 to facilitate the attachment of the fly wheel 3, the fly wheel in effect becoming a part of the driving member of the clutch. This fly wheel is recessed at 4 to receive a bearing 5 for the inner end of the driven shaft 6. The driving and driven shafts are thus supported in axial alinement.

The outer end of the driven shaft is supported in a bearing 7 carried by the housing 8. The fly wheel is provided with a drum 9 having internal longitudinal driving lugs 10 engaging the set of disks 11. A spider 12 is mounted on the shaft 6 adjacent its bearing and is provided with a plurality of driving pins 13 coacting with the clutch disks 14.

The pressure plate 15 is mounted on a sleeve 16 slidable on the shaft 6, the pressure plate coacting with the clutch disks. The means for actuating the pressure plate is indicated at 17. The details of this actuating means are not illustrated.

The sleeve 16 is chambered at 18 to receive the clutch actuating spring 19, one end of which bears against a thrust collar 20 on the shaft 6 and the other engaging the inner end of the sleeve 16.

The shaft 6, the spider 12 and one of the pins 13 are provided with communicating bores providing a lubricant passage 21 opening to the inner end of the shaft 6 and terminating at the outer end of the inner clutch unit. A coupling 22 is provided at the outer end of the lubricant passage to permit the injection of lubricant by means of a grease gun or pump.

By this arrangement of parts the bearing can be efficiently lubricated or the lubricant may be supplied to the bearing without disassembling any of the clutch parts. The housing 8 is provided with hand holes 23 and 24 at the top and bottom thereof so that access may be had to the lubricant passage either from above or below. This makes it convenient to work from a pit or through the floor of a vehicle.

Figure 3:
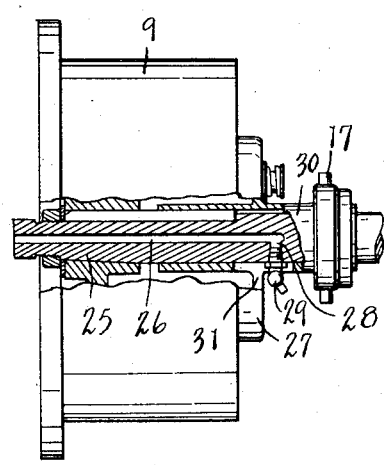
Fig. 3 is a fragmentary view partially in longitudinal section of a modified form or embodiment of my invention.

In the modification shown in Fig. 3 the shaft 25 has a longitudinal bore 26 extending to the outside of the inner clutch member designated generally by the numeral 27. The shaft has a lateral passage 28 communicating with the longitudinal passage, the coupling member 29 being mounted directly on the shaft. In this embodiment the clutch adjusting sleeve 30 is slotted at 31 to receive the coupling 29 and to permit the movement of the sleeve 30.

The details of this embodiment in so far as the arrangement of clutch elements is concerned are not illustrated as the particular purpose of the modification is to illustrate an adaptation in which the lubricant passage is formed entirely in one of the shafts of the clutch.

I have not attempted to illustrate or describe other embodiments and adaptations contemplated as it is believed this disclosure will enable those skilled in the art to embody or adapt the same as may be desired.

Clutches embodying my improvements are easily kept efficiently lubricated which is of very decided advantage in that the inner bearings of clutches are not accessible for replacement without dissassembling the transmission, which results in very substantial loss, particularly in taxicabs, trucks and commercial vehicles. In such vehicles the clutch is ordinarily subjected to more severe usage than in pleasure vehicles.

Having thus described my invention what I claim as new and desire to secure by Letters Patent is:

1. In a clutch, the combination with a housing, of a driving shaft, a driven shaft disposed in axial alinement with said driving shaft, a bearing on said driving shaft supporting the inner end of the driven shaft, said housing being provided with a bearing for the outer end of said driven shaft, a clutch drum on said driving shaft provided with disk engaging lugs, a spider on said driven shaft provided with a plurality of disk engaging pins, said driven shaft, spider and one of said pins being provided with registering bores opening to said bearing on said driving shaft to provide a lubricant passage leading from the outer end of the clutch to the bearing, there being a lubricant pump coupling mounted on said pin having said bore therein, said housing having hand holes in the top and bottom affording access to said coupling, and sets of coacting clutch disks engaging respectively said lugs on said drum and said pins on said spider.

2. In a clutch, the combination with a housing, of a driving shaft, a driven shaft disposed in axial alinement with said driving shaft, a bearing on said driving shaft supporting the inner end of the driven shaft, said housing being provided with a bearing for the outer end of said driven shaft, a clutch drum on said driving shaft provided with disk engaging lugs, a spider on said driven shaft provided with a plurality of disk engaging pins, said driven shaft, spider and one of said pins being provided with registering bores opening to said bearing on said driving shaft to provide a lubricant passage leading from the outer end of the clutch to the bearing, and sets of coacting clutch disks engaging respectively said lugs on said drum and said pins on said spider.

3. In a clutch, the combination of a driving shaft, a driven shaft disposed in axial alignment with said driving shaft, a bearing on said driving shaft supporting the inner end of said driven shaft, a clutch drum on said driving shaft provided with disk engaging lugs, a spider on said driven shaft provided with a plurality of disk engaging pins, said driven shaft, spider and one of said pins being provided with registering bores opening to said bearing to provide a lubricant passage leading from the outer end of said clutch to the bearing, and sets of coacting clutch disks engaging respectively said lugs on said drum and said pins on said spider.

4. In a clutch, the combination of coacting driving and driven clutch members disposed one within the other, said clutch members being provided with shafts disposed in axial alignment, the shaft of the outer clutch member being provided with a bearing supporting the inner end of the shaft of the inner member, the inner member comprising a spider on said driven shaft provided with a disk engaging pin, said driven shaft, spider and pin being provided with communicating bores opening to said bearing to provide a lubricant passage leading from the outer end of the clutch to the bearing.

5. In a clutch, the combination of coacting driving and driven clutch members, said clutch members being provided with shafts disposed in axial alignment, the driving clutch member being provided with a bearing member having a socket receiving and supporting the inner end of the shaft of the driven member, parts of the driven member including its shaft being provided with communicating bores opening to said socket to provide a lubricant passage leading from an easily accessible part of the driven member of the clutch.

In witness whereof I have hereunto set my hand.

LEO A. BIXBY.